(12) United States Patent
Bauer

(10) Patent No.: US 11,590,904 B2
(45) Date of Patent: Feb. 28, 2023

(54) TRIM ELEMENT FOR A PILLAR OF A MOTOR VEHICLE

(71) Applicant: AUDI AG, Ingolstadt (DE)

(72) Inventor: Martin Bauer, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 184 days.

(21) Appl. No.: 17/269,712

(22) PCT Filed: Aug. 30, 2019

(86) PCT No.: PCT/EP2019/073159
§ 371 (c)(1),
(2) Date: Feb. 19, 2021

(87) PCT Pub. No.: WO2020/064264
PCT Pub. Date: Apr. 2, 2020

(65) Prior Publication Data
US 2022/0410819 A1   Dec. 29, 2022

(30) Foreign Application Priority Data

Sep. 26, 2018   (DE) ..................... 10 2018 216 429.0

(51) Int. Cl.
*B60R 13/02*   (2006.01)
*B60R 21/213*   (2011.01)

(52) U.S. Cl.
CPC .......... *B60R 13/025* (2013.01); *B60R 21/213* (2013.01)

(58) Field of Classification Search
CPC ............................ B60R 13/025; B60R 21/213
USPC ....................................................... 296/39.1
See application file for complete search history.

(56) References Cited

U.S. PATENT DOCUMENTS

| | | | |
|---|---|---|---|
| 6,334,626 B2 * | 1/2002 | Nakajima | B60R 21/213 |
| | | | 280/730.2 |
| 6,502,855 B1 | 1/2003 | Greiner | |
| 6,863,300 B2 * | 3/2005 | Ryu | B60R 21/213 |
| | | | 280/730.2 |

(Continued)

FOREIGN PATENT DOCUMENTS

| | | |
|---|---|---|
| DE | 4308925 A1 | 2/1995 |
| DE | 29822768 U1 | 5/2000 |

(Continued)

OTHER PUBLICATIONS

German Examination Report dated Feb. 27, 2019 in corresponding German Application No. 10 2018 216 429.0; 20 pages; Machine translation attached.

(Continued)

*Primary Examiner* — Joseph D. Pape
(74) *Attorney, Agent, or Firm* — Maier & Maier, PLLC

(57) ABSTRACT

A trim element for a pillar of a body of a motor vehicle is described, in particular for an A pillar, having a main body; an outer side of the main body, which faces toward a vehicle interior in an installed state of the trim element on the pillar, an inner side of the main body, which faces toward the body in an installed state of the trim element on the pillar, a textile element covering the outer side having multiple edge sections folded over onto the inner side, and a bending section, which is formed in the main body, extending essentially along the longitudinal direction of the trim element; and a pivoting section of the main body extending along the bending section.

20 Claims, 5 Drawing Sheets

(56) References Cited

U.S. PATENT DOCUMENTS

2005/0052001 A1  3/2005 Totani et al.
2012/0244770 A1  9/2012 Autterson

FOREIGN PATENT DOCUMENTS

| DE | 10314055 A1 | 10/2004 |
| DE | 69732261 T2 | 12/2005 |
| DE | 102005050370 A1 | 5/2006 |
| DE | 102016003491 A1 | 10/2016 |
| WO | 2007/110048 A1 | 10/2007 |

OTHER PUBLICATIONS

International Search Report (with English translation) and Written Opinion (with Machine translation) dated Jan. 17, 2020 in corresponding International Application No. PCT/EP2019/073159; 19 pages.

* cited by examiner

TRIM ELEMENT FOR A PILLAR OF A MOTOR VEHICLE

FIELD

The invention relates to a trim element for a pillar of a body of a motor vehicle, in particular for an A pillar, and a motor vehicle having a trim element of this type.

In the case of trim elements of this type, attaching a textile element to the outer side and folding an edge section over onto the inner side and connecting it to the inner side is known. The edge section is typically minimally dimensioned, so that the folded-over edge section only covers a small area of the inner side. The edge section only forms a type of seam, which is welded or adhesively bonded to the inner side of the trim element.

Reference is made in this regard, for example, to DE 43 089 25 A1.

In some motor vehicle types, trim elements of this type also cover an inflatable airbag accommodated behind it, in particular a head airbag, which is typically provided in the front pillars (A pillars) of a motor vehicle. If the airbag is inflated in case of collision, the risk exists that the trim element will not deform along a provided bending section, but undesired deformations will occur at other points. The unobstructed and planned unfolding of the airbag can be impaired in this way.

SUMMARY

The object on which the invention is based is considered that of specifying a trim element with which the risk of undesired deformations during the inflation of the airbag is reduced or even excluded.

A trim element for a pillar of a body of a motor vehicle, in particular for an A pillar, is thus proposed, having a main body;
an outer side of the main body, which faces toward a vehicle interior in an installed state of the trim element on the pillar;
an inner side of the main body, which faces toward the body in an installed state of the trim element on the pillar;
a textile element covering the outer side having multiple edge sections folded over onto the inner side;
a bending section extending essentially along a longitudinal direction of the trim element, which is formed in the main body; and
a pivoting section of the main body extending along the bending section, which is connected to the bending section and is pivotable around the bending section under the action of force, wherein the trim element is configured to accommodate an inflatable airbag in its non-inflated state. It is provided that at least one edge section of the textile element is arranged on the inner side over the bending section and is connected in a materially-bonded manner to the inner side at multiple joining points, wherein the joining points are arranged along the bending section.

The folded-over edge section of the textile element, which is arranged on the inner side of the main body of the trim element over the bending section and is fastened by means of the joining points, enables forces which act on the trim element to be absorbed. In particular, the edge section can absorb traction forces acting on the trim element or the main body and counteract an undesired deformation of the main body. It can thus be ensured by the folded-over edge section that in case of the inflation of the airbag covered by the trim element, planned pivoting up of the pivoting section of the main body takes place with deformation of the bending section. The textile edge section forms a reinforcement of the main body and enables the pivoting section to be pivoted around the bending section, without the bending section being deformed in an undesired way under the high force action of the explosively inflating airbag.

The bending section is also referred to as a so-called splitting line. In the main body, the bending section is formed in particular by a linear material thinning. In other words, the bending section can also be referred to as an elastically deformable material hinge. The main body of the trim element can be produced from a plastic. The textile element is understood as an element which is formed from natural or artificial fibers and/or threads, for example natural-fiber-reinforced plastics or the like.

The joining points can be arranged on both sides of the bending section. It is ensured in this way that acting forces can be absorbed on both sides of the bending section by the textile edge section.

The joining points on one side of the bending section can be arranged offset in relation to the joining points on the other side of the bending section. In other words, the joining points can be arranged along an imaginary zigzag line starting from a first joining point on one side of the bending section, wherein each section of the zigzag line intersects the bending section and connects two joining points on different sides of the bending section. Such an offset arrangement of joining points on both sides of the bending section enables improved distribution or introduction of acting forces.

The joining points can furthermore be arranged with spacing to the bending section. The spacing of a joining point to the bending section can be equal to or greater than a width of the joining point measured essentially orthogonally to the longitudinal direction of the bending section. The spacing between the bending section and adjoining point is, for example approximately 3 to 15 mm, preferably approximately 5 to 10 mm By providing a spacing of the joining points from the bending section, the traction force acting in case of pivoting of the flap section can be absorbed better by the edge section.

The joining points can be ultrasonic welding points or adhesive points. In addition to ultrasonic welding, other welding methods can also be used, by which a materially-bonded connection is producible between the textile edge section and the main body.

The folded-over edge section can be arranged in the region of the inner side over the bending section, behind which the airbag is arranged in the installed state. Accordingly, it is not absolutely necessary, although it is conceivable, for the edge section to be folded over onto the inner side over the entire length of the main body so that it is arranged over the bending section. Rather, the edge section can be arranged only in an upper region with respect to the installed state on the motor vehicle, in particular in an upper half of the trim element above the bending section.

An upper or lower folded-over edge section of the textile element can be arranged on a lateral folded-over edge section. It is ensured in this way that the region of the trim element which the airbag encounters first during inflation encounters two edge sections located one over another, so that undesired deformation of the main body at this point can be effectively prevented.

Furthermore, a motor vehicle is also proposed having a body, wherein the body comprises multiple pillars in an upper region, in particular two front A pillars; having at least one above-described trim element, wherein the trim element is attached to one of the pillars; and having an inflatable airbag, which is accommodated behind the trim element with respect to a vehicle interior. The trim element can be in particular a trim element for the two A pillars, wherein a respective (non-inflated) head airbag for the driver side or the front passenger side, respectively, is accommodated behind the trim element.

BRIEF DESCRIPTION OF THE FIGURES

Further advantages, features, and details of the invention result from the claims, the following description of preferred embodiments, and the drawings. In the figures:

FIG. 6 shows a schematic and greatly simplified illustration of a detail of the trim element with

DETAILED DESCRIPTION

A trim element 10 is described hereinafter referring simultaneously to FIG. 1 and the various sections of FIGS. 2 to 5.

Figure 1:
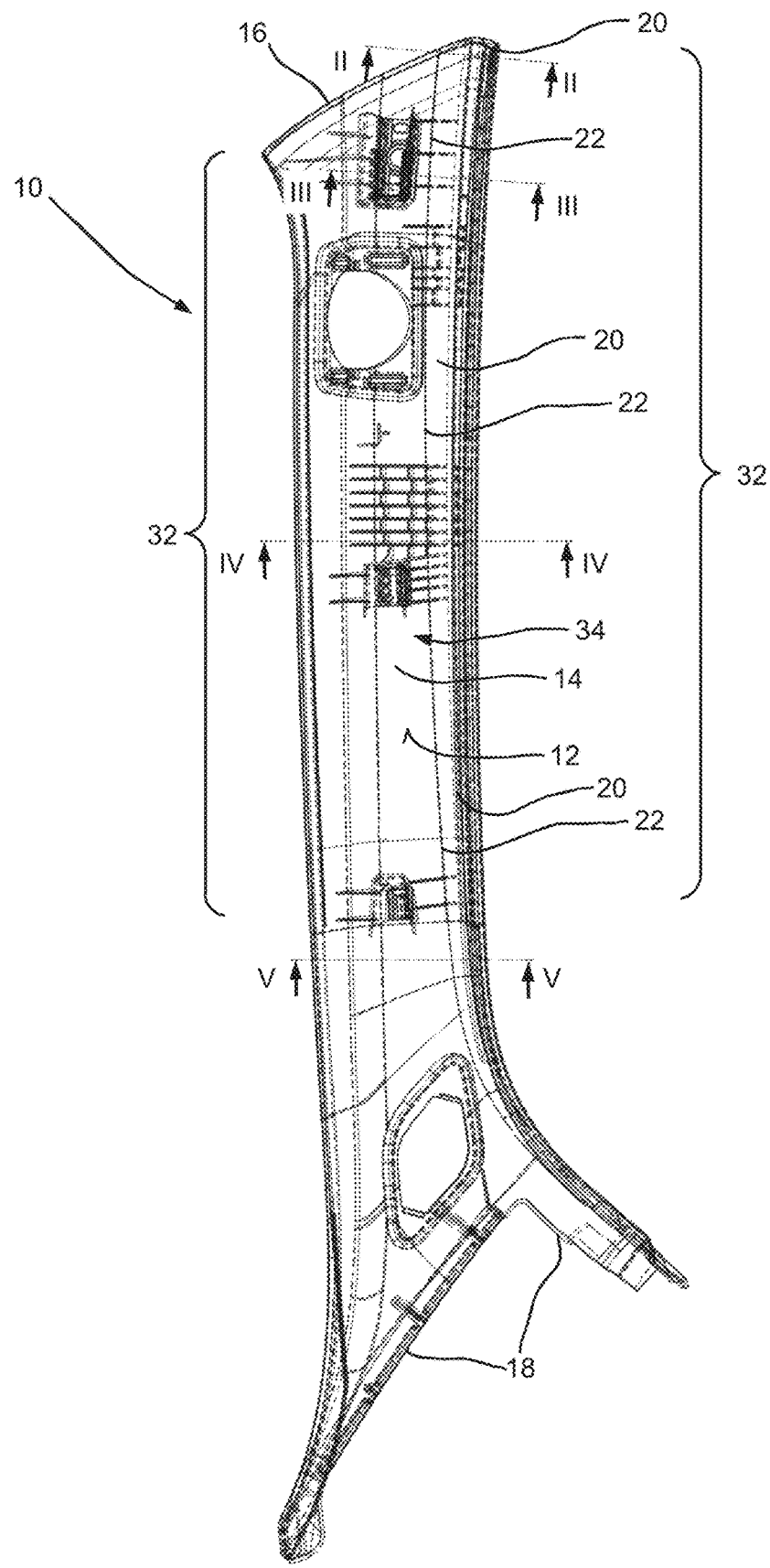
FIG. 1 shows a simplified and schematic perspective illustration of a trim element of an A pillar of a vehicle.

A trim element 10 for an A pillar of a body of a motor vehicle is shown in a simplified and schematic perspective illustration in FIG. 1. The trim element is illustrated so that the view is toward an inner side 12 of a main body 14. In an installed state of the trim element 10 on an A pillar of a vehicle, the inner side 12 faces toward the A pillar (body). The main body 14 and the inner side 12 are also apparent from the sectional illustrations of FIG. 2. Furthermore, the outer side 13 of the trim element 10 is apparent from the sectional illustrations of FIGS. 2 to 5. The outer side 13 is facing toward the vehicle interior in an installed state of the trim element on an A pillar. The material or textile side oriented toward the interior of the vehicle is illustrated by the thicker black line shown on the outer side 13 in FIGS. 2 to 5.

The trim element 10 illustrated here is designed for the A pillar on the left side of a vehicle. With respect to its installed state in a vehicle, the trim element 10 has an upper end 16 and a lower end 18. In its state installed on the A pillar, the trim element 10 covers a collapsed, inflatable airbag (not shown). In case of a collision, the airbag is filled with gas (inflated) and exits from its housing behind the trim element 10 in the direction of the interior of the vehicle. The trim element 10 is displaced or deformed in this case by the inflating airbag.

The trim element 10 has a pivoting section 20 on its main body 14. A bending section 22, which forms a type of hinge for the pivoting section 20, extends along the pivoting section 20. The bending section 22 is also referred to as a so-called splitting line. The bending section 22 is formed in particular by a linear material thinning in the main body 14. In other words, the bending section 22 can also be referred to as an elastically deformable material hinge. It is apparent from the sections of FIGS. 2 to 5 that the bending section is formed as a notch between the main section 14 and the pivoting section 20.

Figure 5:
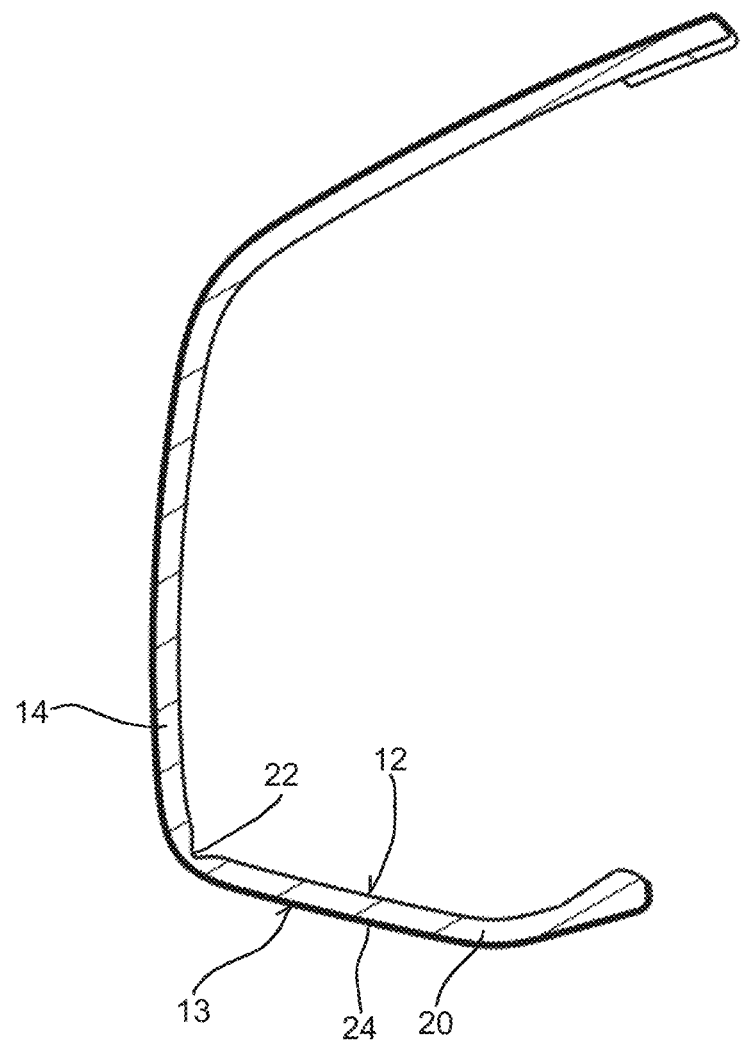
FIG. 5 shows a sectional illustration corresponding to section line V-V of FIG. 1.

The outer side 13 of the trim element 10 is typically formed by a textile element 24, which is simply illustrated as a thicker black line in the sectional illustrations of FIGS. 2 to 5. The textile element 24 has multiple edge sections 26, which are folded over onto the inner side 12 of the main body 14, as shown in the sectional illustrations of FIGS. 2 to 4. FIG. 5 shows a section through the trim element 10 in a region which no longer covers an airbag. Since forces which are not as great act in this region during the inflation of the airbag, the edge section 26 or folded-over material is dimensioned smaller or is not required.

In the trim element 10 presented here, the edge section 26 of the textile element 24 which is folded over onto the inner side 12 from the outer side 13 in the region of the pivoting section 20 is specifically formed. In particular, the edge section 26 is dimensioned so that it extends on the inner side 12 beyond the bending section 22. In other words, the folded-over edge section 26, which can also be referred to as folded-over material, covers the inner side of the pivoting section 20 and the bending section 22. Furthermore, the folded-over edge section 26 also covers a part of the main body 14, which extends along the bending section 22, but is not part of the pivoting section 20.

The edge section 26 is connected in a materially-bonded or integrally-joined manner to the main body 14 or the pivoting section 22 along the bending section 22 and on both sides of the bending section 20. In particular, the edge section 26 is welded, in particular ultrasonically welded, or adhesively bonded to the main body 14 or the pivoting section at multiple positions or joining points 30 along the bending section 22 and on both sides of the bending section 22.

Figure 6:
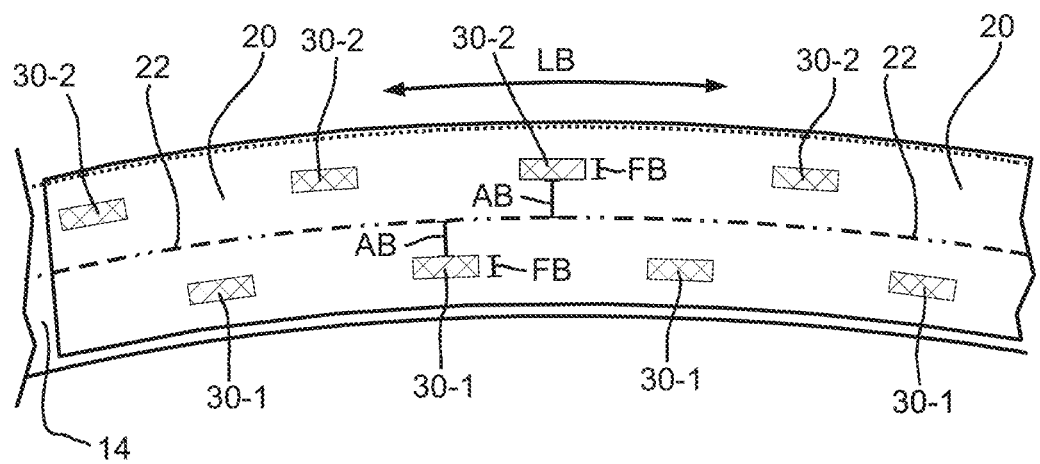

The exemplary arrangement of joining points 30 along the bending section 22 is shown in simplified and schematic form in FIG. 6. The joining points 30-1 on one side of the bending section 22 can be arranged offset here to the joining points 30-2 on the other side of the bending section 22. Furthermore, the joining points 30-1, 30-2 can be arranged with spacing AB to the bending section. The spacing AB of a joining point 30-1, 30-2 to the bending section 22 can be equal to or greater than a width FB of the joining point 30-1, 30-2 measured essentially orthogonally to the longitudinal direction LB of the bending section 22.

The folded-over edge section 26, as is apparent from FIG. 1, is in particular arranged in the region 32 of the inner side 12 over the bending section 22, behind which the airbag is arranged in the installed state. In the present example, this region 32 extends over approximately two-thirds to three-fourths of the length of the trim element 10. This region 32 can also be referred to as the upper section 34 of the trim element 10. The upper section 34 extends here from the upper end 16 in the direction of the lower end 18, wherein it does not comprise the lower end 18.

Figure 2:
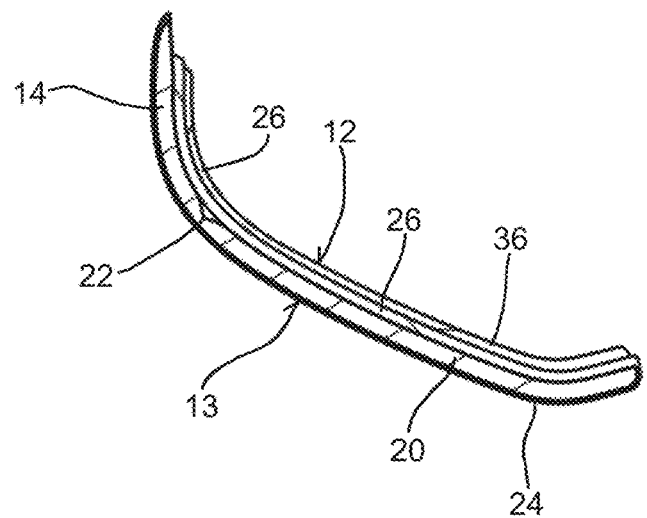
FIG. 2 shows a sectional illustration corresponding to section line II-II of FIG. 1.
Figure 3:
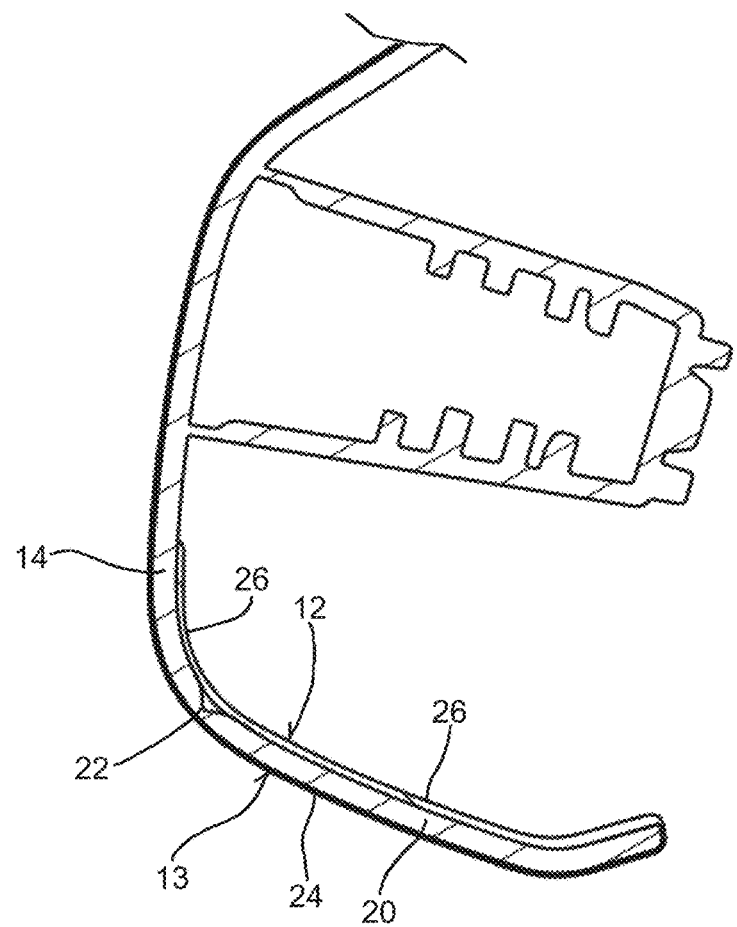
FIG. 3 shows a sectional illustration corresponding to section line of FIG. 1.
Figure 4:
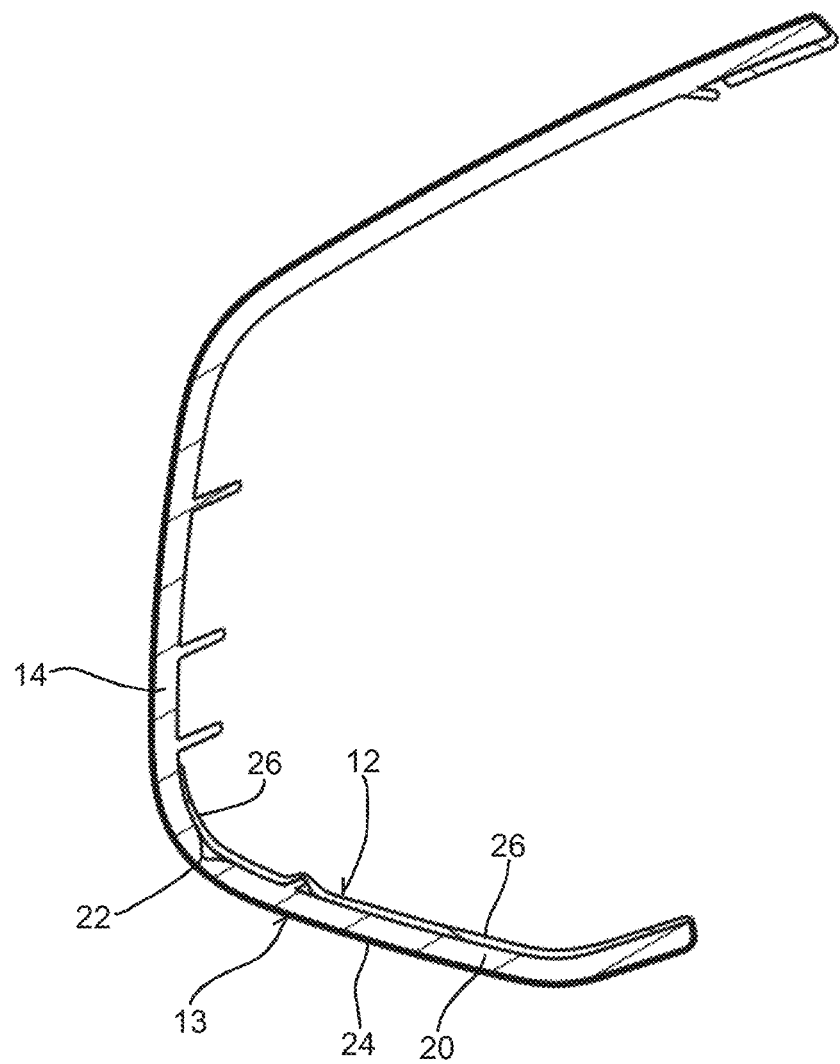
FIG. 4 shows a sectional illustration corresponding to section line IV-IV of FIG. 1.

In the trim element 10, an upper or lower folded-over edge section 36 of the textile element 24 can be arranged on a lateral folded-over edge section 26, as is apparent from the sectional illustration of FIG. 2. In other words, the lateral edge section 26 is located in the region of the upper end 16 or the lower end 18 below an upper or lower folded-over edge section 36, respectively.

The main body 14 of the trim element 10 can be produced from a plastic. The textile element 24 is understood as an element which is formed from natural or artificial fibers and/or threads, for example natural-fiber-reinforced plastics or the like.

Due to the arrangement presented here of a folded-over edge section 26 or folded-over material of the textile element 24 over the bending section 22, the forces acting on the trim element 10 or the pivoting section 20 during the inflation of the airbag can be absorbed and dissipated better. In particular, the risk of undesired deformation of the trim element 10, for example starting from its upper end 16 downward, possibly along the bending section 22, is reduced, because the folded-over edge section 26, which is connected in a materially-bonded or integrally-joined manner to the main body 14 or the pivoting section 20 on both sides of the bending section 22, can absorb correspondingly acting traction forces. The edge section 26 or folded-over material thus acts as a reinforcement of the hinge-like bending section 22 and ensures correct pivoting or movement of the pivoting section 20, without the trim element 10 being unpredictably damaged during the unfolding of the airbag.

The invention claimed is:

1. A trim element for a pillar of a body of a motor vehicle, in particular for an A pillar, comprising:
    a main body;
    an outer side of the main body, which faces toward a vehicle interior in an installed state of the trim element on the pillar,
    an inner side of the main body, which faces toward the body in an installed state of the trim element on the pillar,
    a textile element covering the outer side having multiple edge sections folded over onto the inner side, and
    a bending section, which is formed in the main body, extending essentially along the longitudinal direction of the trim element; and
    a pivoting section of the main body extending along the bending section, wherein the pivoting section is connected to the bending section and is pivotable around the bending section under force action,
    wherein the trim element is configured to accommodate an inflatable airbag in its non-inflated state,
    wherein the at least one edge section of the textile element is arranged on the inner side over the bending section and is connected in a materially bonded manner at multiple joining points to the inner side, wherein the joining points are arranged along the bending section.

2. The trim element as claimed in claim 1, wherein the joining points are arranged on both sides of the bending section.

3. The trim element as claimed in claim 2, wherein the joining points on one side of the bending section are arranged offset to the joining points on the other side of the bending section.

4. The trim element as claimed in claim 1, wherein the joining points are arranged with spacing to the bending section.

5. The trim element as claimed in claim 4, wherein the spacing of a joining point to the bending section is equal to or greater than a width of the joining point measured essentially orthogonally to the longitudinal direction of the bending section.

6. The trim element as claimed in claim 1, wherein the joining points are ultrasonic weld points or adhesive points.

7. The trim element as claimed claim 1, wherein the folded-over edge section is arranged in the region of the inner side over the bending section, behind which the airbag is arranged in the installed state.

8. The trim element as claimed in claim 1, wherein an upper or lower folded-over edge section of the textile element is arranged on a lateral folded-over edge section.

9. A motor vehicle, comprising:
    a body, wherein the body comprises multiple pillars in an upper region, in particular two front A pillars;
    at least one trim element as claimed in any one of the preceding claims, wherein the trim element is attached to one of the pillars; and
    having an inflatable airbag, which is accommodated behind the trim element with respect to a vehicle interior.

10. The trim element as claimed in claim 2, wherein the joining points are arranged with spacing to the bending section.

11. The trim element as claimed in claim 3, wherein the joining points are arranged with spacing to the bending section.

12. The trim element as claimed in claim 2, wherein the joining points are ultrasonic weld points or adhesive points.

13. The trim element as claimed in claim 3, wherein the joining points are ultrasonic weld points or adhesive points.

14. The trim element as claimed in claim 4, wherein the joining points are ultrasonic weld points or adhesive points.

15. The trim element as claimed in claim 5, wherein the joining points are ultrasonic weld points or adhesive points.

16. The trim element as claimed in claim 2, wherein the folded-over edge section is arranged in the region of the inner side over the bending section, behind which the airbag is arranged in the installed state.

17. The trim element as claimed in claim 3, wherein the folded-over edge section is arranged in the region of the inner side over the bending section, behind which the airbag is arranged in the installed state.

18. The trim element as claimed in claim 4, wherein the folded-over edge section is arranged in the region of the inner side over the bending section, behind which the airbag is arranged in the installed state.

19. The trim element as claimed in claim 5, wherein the folded-over edge section is arranged in the region of the inner side over the bending section, behind which the airbag is arranged in the installed state.

20. The trim element as claimed in claim 6, wherein the folded-over edge section is arranged in the region of the inner side over the bending section, behind which the airbag is arranged in the installed state.

* * * * *